United States Patent
Booker

(10) Patent No.: US 7,896,749 B2
(45) Date of Patent: Mar. 1, 2011

(54) DIRECT TORQUE FLOW CONNECTION WITH OPTIMIZED RATIOS IN ATTACHMENT METHODS

(75) Inventor: Danny Lee Booker, Oakland Township, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 10 days.

(21) Appl. No.: 12/099,946

(22) Filed: Apr. 9, 2008

(65) Prior Publication Data
US 2008/0188317 A1   Aug. 7, 2008

Related U.S. Application Data

(63) Continuation of application No. PCT/US2005/036299, filed on Oct. 11, 2005.

(51) Int. Cl.
*F16D 3/224* (2006.01)

(52) U.S. Cl. .................. 464/145; 464/171; 464/906

(58) Field of Classification Search .......... 464/145, 464/171, 906
See application file for complete search history.

(56) References Cited

U.S. PATENT DOCUMENTS

| 1,916,442 A * | 7/1933 | Rzeppa ................. 464/145 |
| 2005/0153782 A1 | 7/2005 | Jacob |
| 2007/0032303 A1 | 2/2007 | Disser |

FOREIGN PATENT DOCUMENTS

| DE | 10215657 A1 | 10/2003 |
| EP | 1519063 B1 | 11/2008 |

* cited by examiner

*Primary Examiner*—Greg Binda
(74) *Attorney, Agent, or Firm*—Jennifer M. Brumbaugh; Rader, Fishman & Grauer PLLC

(57) ABSTRACT

The present application is directed to a direct torque flow connector for torque transmission. The DTF connector includes a direct torque flow constant velocity universal joint having an outer race part and an inner race part, and a shaft coupled to the outer race part. The direct torque flow connector has at least one direct torque flow optimized ratio. Further, the inner race part of the direct torque flow connector may be selectively connected to a journal shaft of a drive unit. A direct torque flow connection with optimized ratios in attachment methods is also provided.

14 Claims, 3 Drawing Sheets

| Fitment Stability Ratio (FS) Ranges | Dynamic Load Capacity (DLC) Ranges | Spline Offset Ratio (SO) Ranges | Outer Race Tube Ratio (ORT) Ranges |
|---|---|---|---|
| 0.5 – 3.2 | 1.0 – 8.0 | 0.3 – 1.0 | 0.5 – 2.0 |
| 1.5 – 3.2 | 3.0 – 8.0 | 0.5 – 1.0 | 1.0 – 2.0 |
| 2.5 – 3.2 | 5.0 – 8.0 | 0.7 – 1.0 | 1.5 – 2.0 |

| Fitment Stability Ratio (FS) Ranges | Dynamic Load Capacity (DLC) Ranges | Spline Offset Ratio (SO) Ranges | Outer Race Tube Ratio (ORT) Ranges |
|---|---|---|---|
| 0.5 – 3.2 | 1.0 – 8.0 | 0.3 – 1.0 | 0.5 – 2.0 |
| 1.5 – 3.2 | 3.0 – 8.0 | 0.5 – 1.0 | 1.0 – 2.0 |
| 2.5 – 3.2 | 5.0 – 8.0 | 0.7 – 1.0 | 1.5 – 2.0 |

FIG. 5

DIRECT TORQUE FLOW CONNECTION WITH OPTIMIZED RATIOS IN ATTACHMENT METHODS

This application is a continuation of International Application No. PCT/US2005/036299 originally filed on Oct. 11, 2005.

TECHNICAL FIELD

The present invention relates generally to motor vehicle propeller shaft couplings, and more particularly concerns a direct torque flow connection with optimized ratios in attachment methods.

BACKGROUND ART

Constant velocity joints connecting interconnecting shafts to drive units are common components in automotive vehicles. The drive unit typically has an output shaft or an input shaft for receiving the joint. Typically, the drive unit is an axle box, transfer case, transmission, power take-off unit or other torque device, all of which are common components in automotive vehicles. Typically, one or two joints are assembled to the shaft to form a propeller or drive shaft assembly. It is the propeller shaft assembly that is connected, for instance, at one end to the output shaft of a transmission and, at the other end, to the input shaft of a differential. The shaft is solid or tubular with ends adapted to attach the shaft to an inner race of the joint thereby allowing the outer race connection to a drive unit. The inner race of the joint is typically press fit, splined, or pinned to the shaft making the outer race of the joint available to be bolted or press fit to a hub connector, flange or stubshaft of the particular drive unit. At the other end of the propeller shaft, the same typical connection is made to a second drive unit when connecting the shaft between the two drive units.

Motor vehicles commonly use propeller or drive shafts to transfer torque from the one input unit to an output unit, e.g. from a front drive unit to a rear axle differential such as in rear wheel and all wheel drive vehicles. Propeller shafts are also used to transfer torque and rotational movement to the front axle differential in four-wheel drive vehicles. In particular, two-piece propeller shafts connected by an intermediate joint are commonly used when larger distances exist between the front drive unit and the rear axle of the vehicle. Similarly, inboard and outboard axle drives are commonly used in motor vehicles to transfer torque from a differential to the wheels. The torque transfer is achieved by using a propeller shaft assembly consisting of one or two joints assembled to an interconnecting shaft in the manner indicated above.

Joint types used include Cardan, Hooke or Rzeppa type universal joints. Typically, Rzeppa type constant velocity joints are employed where transmission of a constant velocity rotary or homokinetic motion is desired or required. Constant velocity joints include tripod joint, double offset joint, and cross groove designs having plunging or fixed motion capabilities. The tripod type constant velocity joint uses rollers or trunions as torque transmitting members and the other constant velocity joint types use balls as torque transmitting members. These types of joints assembled to an interconnecting shaft are applied in inboard axle and outboard axle drives for front wheel drive vehicles, or rear wheel drive vehicles, and on the propeller shafts found in rear wheel drive, all wheel drive, and four-wheel drive vehicles allowing for angular articulation or axial motion.

The torque transfer capability of a drive shaft is primarily influenced by its moment of inertia, which is primarily a function of the maximum radius of the shaft rather than its mass. Thus, it would be desirable to have a shaft to joint connection that benefits from the torque transfer to radius relationship to reduce the mass of the assembly. Moreover, it would also be desirable to provide a system that eliminates unnecessary components, such as the stubshafts or the flanges, thereby providing a drive system connection that has less weight for a given torque transfer capability. Moreover, a connection system that provides a reduced package size for a particular constant velocity joint assembly would also be of benefit. Also, a connection system with optimized ratios would provide additional benefits, such as weight reduction, package size control, reduced number of parts and/or part runout, improved vibration deadening, increased bending stiffness, increased torsional stiffness, and reduced assembly time of propshaft to vehicle connection.

It would be advantageous to have the above-mentioned improvements by providing optimized ratios in attachment methods, particularly in attachment methods for propeller shaft connections utilizing constant velocity joints. While automotive manufactures and suppliers commonly refer to constant velocity joint as, for example, without limitation, DL, VL, GI, AAR, SC and XL type joints, the invention, below, relates to these types of joint configured by optimized ratios in attachment methods to obtain a Direct Torque Flow (DTF) connection.

DISCLOSURE OF THE INVENTION

Accordingly, one embodiment of the present invention provides a Direct Torque Flow (DTF) connection with optimized ratios in attachment methods. In particular, a DTF connection incorporates a new CV joint adapted to attach the inner race directly to a shaft of a drive unit such as an axle, transfer case, transmission, power transfer unit or other device. In a DTF connection, the CV joint outer race part is connected, by welding or other method directly to the propeller or drive shaft assembly. By using the DTF connection, weight reduction is achieved through elimination of stubshafts, and a vehicle flange, thereby reducing the package size of a constant velocity universal joint assembly. The mass distribution along the shaft axis and journal shaft axis of the drive unit is improved by reducing the runout contribution from a companion flange and stubshaft. Additional benefits include improved balance through weight reduction and reduced runout, increased bending stiffness, and reduced assembly time of the propeller shaft assembly to the vehicle by eliminating bolted connections and by decreasing the overall number of parts.

A direct torque flow connector for torque transmission is also provided. The DTF connector includes a direct torque flow constant velocity universal joint having an outer race part, an inner race part, and a shaft coupled to the outer race part. The direct torque flow connector includes at least one direct torque flow optimized ratio. Further, the inner race part of the direct torque flow connector may be selectively connected to a journal shaft of a drive unit.

Also provided is a direct torque flow connection with optimized ratios in attachment methods. According to an embodiment, a direct torque flow assembly is provided including an inner joint part with an axial centreline that defines an inner race width (WIR). The inner joint part comprises inner ball tracks and a spline hole defining a spline length (LS) and adapted to engage a journal shaft of a drive unit; an outer joint part having outer ball tracks and adapted to directly connect to a shaft defining an outer diameter (TD); a cage between the inner joint part and outer joint part; and a plurality of balls (N) each having a diameter (d), the balls held by said cage and engaging pairs of the inner and outer ball tracks, the balls defining a joint pitch circle diameter (PCD). At least one of a fitment stability (FS), dynamic load capacity (DLC), outer race tube (ORT), or spline offset (SO) ratio is satisfied such that:

$$0.5 \leq FS \leq 3.2;$$

$$1 \leq DLC \leq 8;$$

$$0.5 \leq ORT \leq 2.0; \text{ or}$$

$$0.3 \leq SO \leq 1.0$$

wherein, $$FS=(PCD/LS);$$

$$DLC=((PCD/2)*d^2*N))/(1000*LS);$$

$$ORT=(TD/LS); \text{ and}$$

$$SO=(WIR/LS).$$

The present invention has advantages by providing optimized ratios for a direct torque flow joint. The present invention itself together with further objects and intended advantages, will be best understood by reference to the following detailed description and taken in conjunction with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

FIG. 5 shows a table that sets forth ranges for a fitment stability ratio, dynamic load capacity, outer race tube ratio, or spline offset ratio.

DETAILED DESCRIPTION

In the following description, various operating parameters and components are described for one or more constructed embodiments. These specific parameters and components are included as examples and are not meant to be limiting.

While the invention is described with respect to a direct torque flow connection with optimized ratios for use in a vehicle, the following apparatus is capable of being adapted for various purposes including automotive vehicles drive axles, motor systems that use a propeller shaft, or other vehicles and non-vehicle applications which require propeller shaft assemblies for torque transmission.

Figure 1:
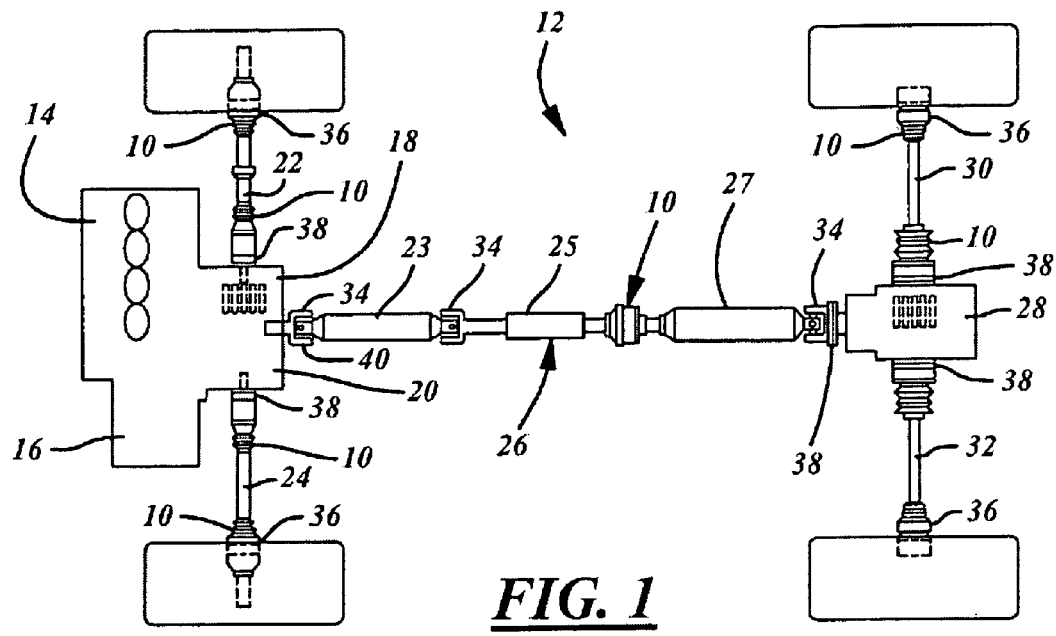
FIG. 1 shows a plan view of an exemplary drive system for a typical 4-wheel drive automobile wherein the present invention may be used to advantage.

An exemplary drive system 12 for a typical 4-wheel drive automobile is shown in FIG. 1. While a 4-wheel drive system is shown and described the concepts here presented could apply to a single drive unit system or multiple drive unit system, including rear wheel drive only vehicles, front wheel drive only vehicles, all wheel drive vehicles, and four wheel drive vehicles. In this example, the drive system 12 includes an engine 14 that is connected to a transmission 16 and a power take-off unit 18. A front differential 20 has a right hand side half shaft 22 and left hand side half shaft 24 each of which are connected to a wheel and deliver power to the wheels. On both ends of the right hand side half shaft 22 and left hand side half shaft 24 are constant velocity joints 10. A propeller shaft 26 connects the front differential 20 to a rear differential 28 wherein the rear differential 28 includes a rear right hand side shaft 30 and a rear left hand side shaft 32, each of which ends with a wheel on one end thereof. Constant velocity joints 10 are located on both ends of the half shafts 30, 32 that connect to the wheels and the rear differential 28. The propeller shaft 26, shown in FIG. 1, is a three-piece propeller shaft that includes a plurality of Cardan joints 34 and one high-speed constant velocity joint 10. The propeller shaft 26 includes interconnecting shafts 23, 25, 27. The constant velocity joints 10 transmit power to the wheels through the propeller shaft 26 even if the wheels or the propeller shaft 26 have changed angles due to steering, raising or lowering of the suspension of the vehicle. The constant velocity joints 10 may be any of the standards types known, such as a plunging tripod, a cross groove joint, a fixed joint, a fixed tripod joint, or a double offset joint, all of which are commonly known terms in the art for different varieties of constant velocity joints 10. The constant velocity joints 10 allow for transmission of constant velocities at angles which are found in every day driving of automotive vehicles in both the half shafts and propeller shafts of these vehicles. Optionally, each Cardan joint may be replaced with any other suitable type of joint.

The shafts 22, 23, 24, 25, 27, 30, 32 may be solid or tubular with ends adapted to attach each shaft to an inner race of a joint in accordance with a traditional connection, thereby allowing the outer race to be connected to a hub connector 36, a flange 38 or stubshaft 40 of each drive unit, as appropriate, for the particular application. Thus, any of the traditional connections identified in FIG. 1 at 10 or 34 may be ratio-optimized DTF connections in accordance with the present invention. Because the torque transfer capability of the shaft is primarily influenced by its moment of inertia, which is primarily a function of the maximum radius of the shaft, and less effected by the mass of the shaft, it is desirous to have a system that benefits from the torque/radius transfer relationship in order to reduce the mass of the system.

As used herein, the term direct torque flow (DTF) connection refers to a direct connection from the inner race of a CV joint to the shaft of a differential, transmission or transfer case, generally supplied by customer. The direct connection typically is in the form of a spline because of its robust design features as understood by one skilled in the art. However, it is anticipated that other forms of direct connections are appropriate including fixed and releasable connections between the inner race and shaft. A mating key connection is just one example, without limitation, of a releasable connector between the inner race and the shaft. A welded connection would be a fixed direct connection example. Thus, a DTF connection refers to the inner race coupling to the shaft of a drive unit, such as a differential, transmission or transfer case without limitation, as opposed to the traditional connection mentioned above.

Also, as used herein, a DTF connector refers to a joint coupled to a shaft that forms a DTF propshaft assembly. Only together with the shaft of a differential, for example, does a DTF connector combine to make a DTF connection. It is recognized that the shaft of the drive unit may include the shaft of any input or output drive unit and is not necessarily limited to a shaft of a differential, transmission or transfer case.

The inventor has invented certain relationships between the inner joint part dimensions and the drive shaft or propeller shaft, which enable a robust DTF connection. These relationships are explained in detail below with reference to three exemplary embodiments.

Although three DTF connector types are presented below, it is intended that the present invention may be applied equally to other DTF connector types utilizing the DTF connection relationships detailed herein. Illustratively, the three DTF connectors described are a DTF threaded fastener CVJ (FIG. 2), a DTF collet spring CVJ (FIG. 3) and a DTF clip CVJ (FIG. 4).

Figure 2:
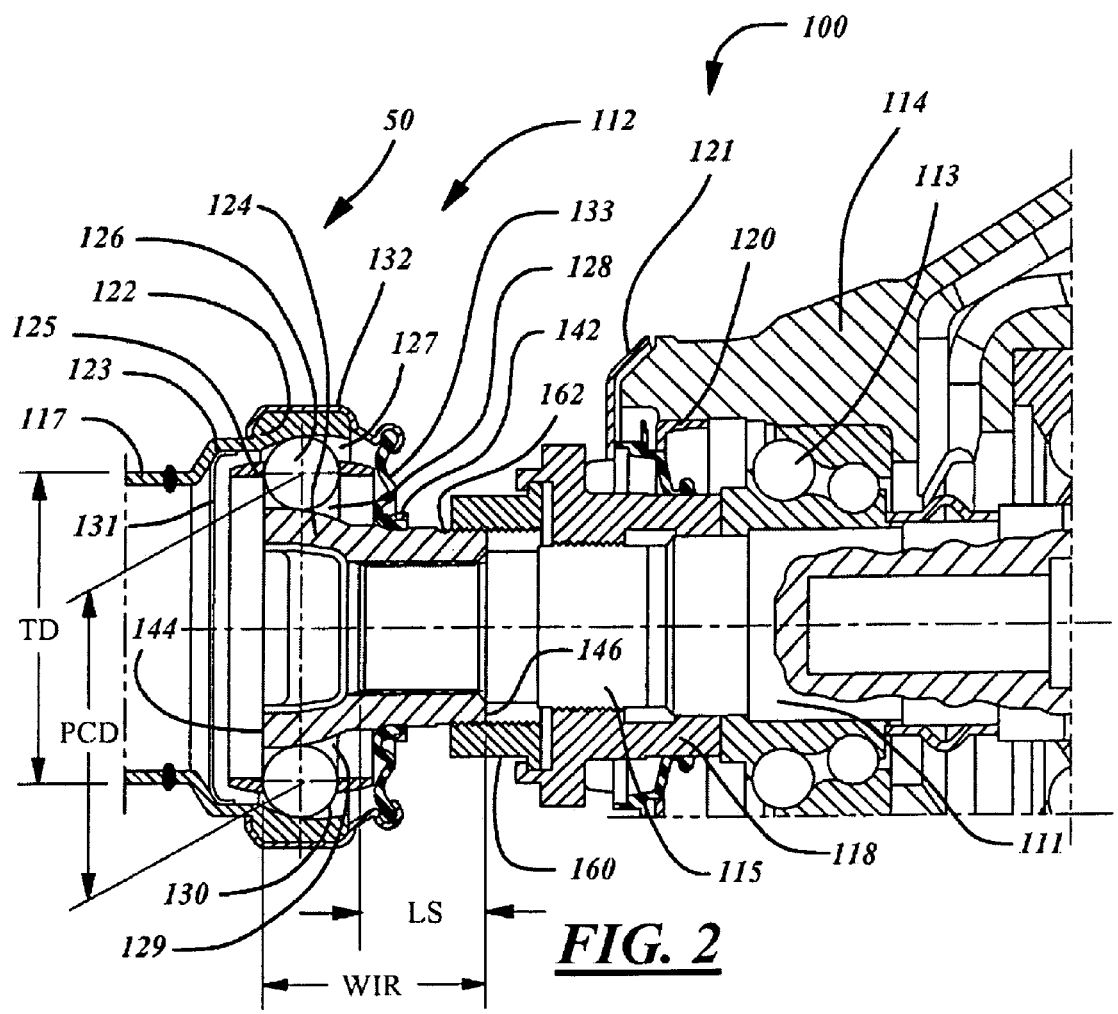
FIG. 2 shows a first embodiment of an inventive DTF connection assembly between a shaft journal and a DTF threaded fastener constant velocity universal joint.
Figures 3, 4:
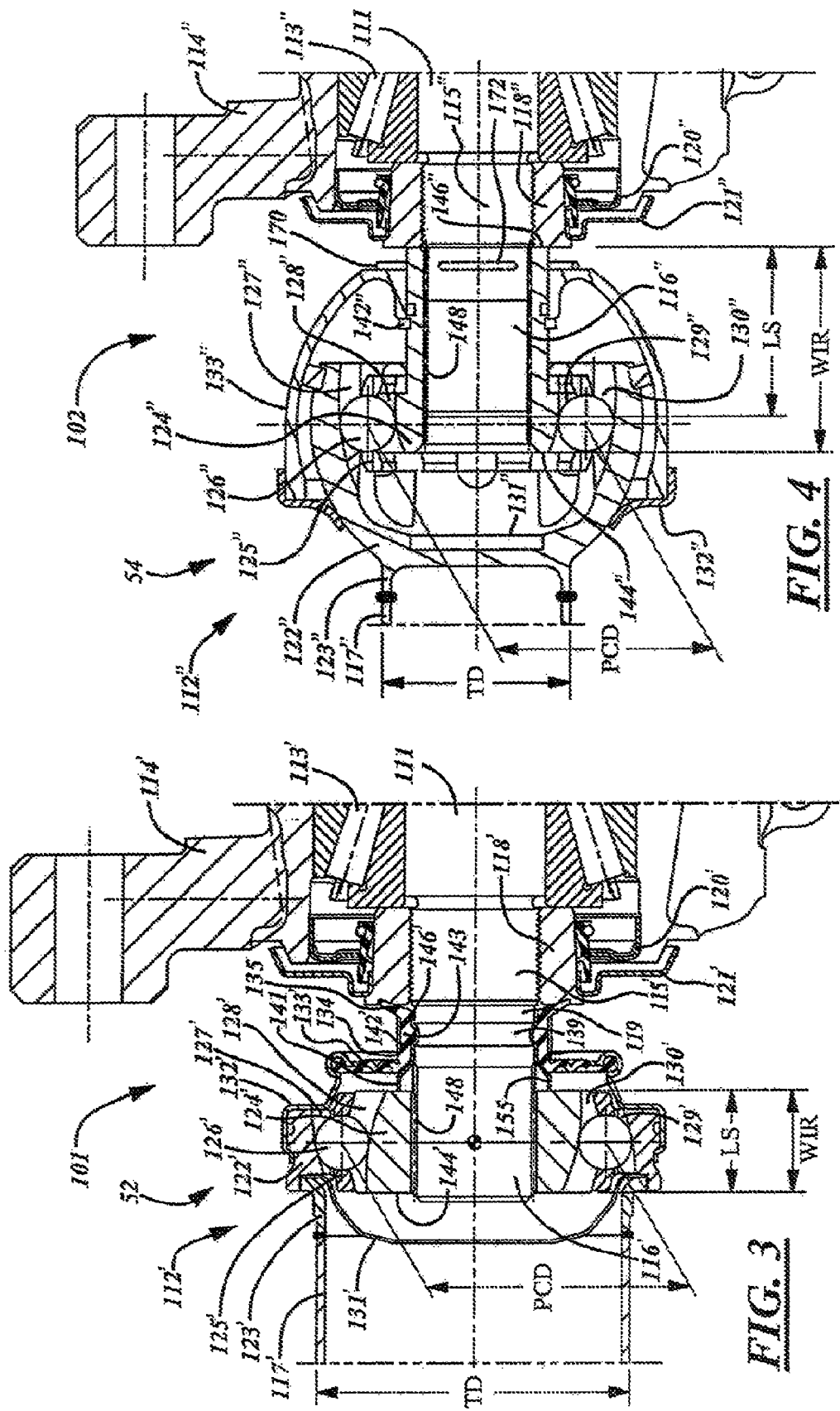
FIG. 3 shows a second embodiment of an inventive DTF connection assembly between a shaft journal and a DTF collet spring constant velocity universal joint.
FIG. 4 shows a third embodiment of an inventive DTF connection assembly between a shaft journal and a DTF clip constant velocity universal joint.

FIGS. 2 through 4 will initially be described jointly below to the extent that their details correspond to one another. In the figures, reference numerals used to identify features in FIG. 2 will include a prime or double prime to identify similar features in FIGS. 3 and 4, respectively. FIGS. 2 through 4 each show a different DTF connection assembly arranged between a shaft journal 111 and a DTF connector constant velocity universal joint 112. The shaft journal is supported by a bearing 113 in a housing 114, which, in this case, is illustrated in the form of a housing in the driveline drive unit of a motor vehicle. The bearing 113 is axially tensioned by a tensioning nut 118 that has been threaded on to a threaded portion 115 of the shaft journal 111. The tensioning nut 118 is sealed relative to the axle housing 114 by a shaft seal 120. By way of a cover 121 secured to the tensioning nut 118, the shaft seal is protected against damage.

The DTF connector constant velocity universal joint 112 is connected to a propeller shaft 117 of the motor vehicle driveline. The DTF connector constant velocity universal joint 112 comprises an outer joint part 122 welded to the propeller shaft 117 by a collar 123, an inner joint part 124, torque transmitting balls 126 as well as a ball cage 125. The inner joint part 124 is secured to a toothed shaft portion 116 of the shaft journal 111 in a rotationally fast way. Between the collar 123 and the outer joint part 122 there is inserted a cover 131, which seals the joint towards the propeller shaft 117 and, more particularly, contains grease within the joint. Furthermore, a metal outer joint part sleeve 132, which encloses the outer circumference of a membrane seal 133 and which, in a way to be described later, seals the DTF connector constant velocity universal joint 112 relative to the shaft journal 111, is positioned on the outer joint part 122. The outer joint part sleeve 132 may be welded and/or rolled onto the outer surface of the outer joint part 122. The DTF connector constant velocity universal joint 112 includes pairs of ball tracks 127, 128, 129, 130. The orientation of each ball track set is dependent upon the type of universal joint selected, which is well understood to a person having skill in the art. The inner joint part 124 includes a front face 144 and a back face 146. The DTF connector constant velocity universal joint detailed components are discussed below.

FIG. 2 shows a first embodiment of an inventive DTF connection assembly 100 between a shaft journal 111 and a DTF threaded fastener constant velocity universal joint 50. A double nut 160 is rotationally free and axially coupled to the tensioning nut 118, whereby the double nut 160 is rotationally securable to a threaded portion 162 of the inner joint part 124 to axially secure the DTF threaded fastener constant velocity universal joint 50 relative to the shaft journal 111. The membrane seal 133 is axially form-fittingly and positively secured to the inner joint part 124 by way of a clamping strip 142. It is recognized that various forms of the DTF threaded fastener constant velocity universal joint 50 may be used to advantage.

FIG. 3 shows a second embodiment of an inventive DTF connection assembly 101 between a shaft journal 111' and a DTF collet spring constant velocity universal joint 52. Between the threaded portion 115' of the shaft journal 111' and the toothed shaft portion 116 of the shaft journal 111', in a fixing portion 119, there is formed an annular groove 139 at the shaft journal 111', which annular groove 139 is engaged by a securing sleeve 141 by way of an inwardly pressed-in annular bead 143 which is axially connected to the inner joint part 124' of the constant velocity universal joint by crimping, or other known methods, to axially secure the DTF collet spring constant velocity universal joint 52 relative to the shaft journal 111'. The securing sleeve 141 is overlapped by a collar portion 134 of the membrane seal 133', which together with the sleeve 141 is axially form-fittingly and positively secured in the annular groove 139 by way of a clamping strip 142'. A sealing lip 135 resting directly against the tensioning nut 118' is formed onto the collar portion 134. The securing sleeve 141 is provided with a cylindrical end portion 155, which is butt-welded to the inner joint part 124' of the DTF collet spring constant velocity universal joint 52. It is recognized that various forms of the DTF collet spring constant velocity universal joint 52 may be used to advantage.

FIG. 4 shows a third embodiment of an inventive DTF connection assembly 102 between a shaft journal 111" and a DTF clip constant velocity universal joint 54. The inner joint part 124" includes insertion grooves 172 for receiving a clip 170 for axially securing the inner joint part 124" to the shaft journal 111" by way of a shaft reception groove (not shown). The membrane seal 133" is axially form-fittingly and positively secured to the inner joint part 124" by way of a clamping strip 142". It is recognized that various forms of the DTF clip constant velocity universal joint 54 may be used to advantage.

While the material, coupling and treatment of the various DTF parts have not been discussed; appropriate selection would be well understood by a person of skill in the art.

In order to obtain the above advantages, the direct torque flow connector and direct torque flow connection have optimized ratios. The optimized ratios represent metrics for reducing mass and mass offset distance from the shaft support bearing to a joint centerline. To achieve this, the following ratios have been optimized: the fitment stability ratio (FS); the dynamic load capacity ratio (DLC); the outer race tube ratio (ORT) and the spline offset ratio (SO).

Before turning to the ratios, the following are parameters utilized in the direct torque flow connector and in the direct torque flow connection. The pitch circle diameter (PCD) is defined as the distance from a ball centerline of opposite sets of track pairs. The PCD may be determined for the inner joint part 124 by using a gage ball matched with the corresponding outer joint part 122. Other methods of determining the PCD may also be used. An inner race width (WIR) is the width along an axial centerline of the inner joint part 124. An internal spline length (LS) represents the length of an internal spline 148 of the inner joint part 124. The internal spline length (LS) on the internal spline 148 is usually equal to or less than a maximum axial length of the inner joint part 124. The internal spline 148 used in the direct torque flow connection is directly attachable to the shaft journal 111 of the particular drive unit.

An optimized fitment stability ratio (FS) helps minimize distortion and control fitment of the spline of the direct torque flow shaft assemblies. The fitment stability ratio is equal to the pitch circle diameter (PCD) divided by the internal spline length (LS). The fitment stability ratio (FS) is calculated for optimized fitment of the direct torque flow connector or the direct torque flow connection and is controlled substantially in the range defined by:

$$0.5 < (PCD/LS) < 3.2.$$

The fitment stability ratio (FS) has improved range at approximately $1.5 \leq FS \leq 3.2$, with even better range at approximately $2.5 \leq FS \leq 3.2$. The fitment stability ratio (FS) ranges contemplated by this disclosure are set forth in the table shown in FIG. 5.

Diminished service life of the joint and excessive distortion of each spline begins to occur when the fitment stability ratio (FS) exceeds 3.2. Under-utilization of torque transfer capability within the joint also occurs when the fitment stability ratio (FS) falls below 0.5, representing unnecessary weight within the inner joint part 124. In addition, when the fitment stability ratio (FS) falls below 0.5 excessive strain may be placed upon the inner joint part 124, the balls 126 and the outer joint part 122 during torque transfer, which may cause premature failure of the joint or, at least, excessive wear.

An optimized dynamic load capacity ratio (DLC) of the direct torque flow connector or the direct torque flow connection has the advantages above and additionally provides for improved service life of the joint. The dynamic load capacity ratio (DLC) is equal to a torque conversion factor (GT) divided by the internal spline length (LS). The torque conversion factor is equal to:

$$GT = ((PCD/2)*d^\wedge 2*N)/1000$$

wherein d is the ball diameter, N is the number of balls 126 within the joint, and whereby all units are in millimetres.

The torque conversion factor typically ranges between 30-70. Hence, $DLC = GT/LS = ((PCD/2)*d^\wedge 2*N)/(1000*LS)$.

The dynamic load capacity ratio (DLC) has improved range at approximately $3 \leq DLC \leq 8$, with even better range at approximately $5 \leq DLC \leq 8$, the dynamic load capacity ratio (DLC) ranges contemplated by this disclosure are set forth in the table shown in FIG. 5.

The dynamic load capacity ratio (DLC) has improved range at approximately $3 \leq DLC \leq 8$, with even better range at approximately $5 \leq DLC \leq 8$.

Diminished service life of the joint begins to occur when the dynamic load capacity ratio (DLC) exceeds 8.0, and the spline of the joint is subject to torque exceeding its design capability for sustained service life. Under-utilization of torque transfer capability within the joint also occurs when the dynamic load capacity ratio (DLC) falls below 1.0, representing unnecessary weight within the inner joint part due to the excessive spline length of the part. In addition, the inner joint part 124, the balls 126 and the outer joint part 122 are subjected to excessive loads when the dynamic load capacity ratio (DLC) falls below 1.0 resulting in substantially decreased service life of the joint for a give torque load.

An optimized outer race tube ratio (ORT) also has the above advantages. The outer race tube ratio (ORT) is equal to the outer or tube diameter (TD) of the propeller shaft 117 divided by the internal spline length (LS). The outer race tube ratio (ORT) is calculated for advantage of the direct torque flow connector or the direct torque flow connection and is controlled substantially in the range defined by:

$$0.5 \leq (TD/LS) \leq 2.0.$$

The outer race tube ratio (ORT) has improved range at approximately $1.0 \leq ORT \leq 2.0$, with even better range at approximately $1.5 \leq ORT \leq 2.0$. The outer race tube ratio (ORT) ranges contemplated by this disclosure are set forth in the table shown in FIG. 5.

The diameter TD measurement may be that of the outer diameter or the tube diameter. Specifically, the diameter TD measurement may be of the outer diameter for a solid shaft and may be the effective tube diameter for a tube style of shaft, such as propeller shaft 117.

When the outer race tube ratio (ORT) falls below 0.5, the shaft coupled to the outer race part 122 may only handle a fraction of the torque transferred by the splined connection between the inner race part 124 and the journal shaft 111 of the drive unit. When the outer race tube ratio (ORT) exceeds 2.0, the shaft coupled to the outer race part 122 is over-sized or has unnecessary weight being capable of receiving far more torque than can be transferred to it.

An optimized spline offset ratio (SO) also has the above advantages. The spline offset ratio (SO) is equal to the inner race width (WIR) divided by the internal spline length (LS). The spline offset ratio (SO) is calculated for advantage of the direct torque flow connector or the direct torque flow connection and is controlled substantially in the range defined by:

$$0.3 \leq (WIR/LS) \leq 1.0$$

The spline offset ratio (SO) has improved range at approximately $0.5 \leq SO \leq 1.0$, with even better range at approximately $0.7 \leq SO \leq 1.0$. The spline offset ratio (SO) ranges contemplated by the disclosure are set forth in the table shown in FIG. 5.

The spline offset ratio (SO) falling below 0.3 represents diminished torque transfer capability from the spline to the inner joint part 124 and may also represent excess weight. A spline offset ratio (SO) between 0.3 and 1.0 represents a proper balance of torque transfer capability of the spline to the torque transfer capability of the ball tracks 128, 130 of the inner joint part 124. The spline offset ratio (SO) exceeding 1.0 represents an impractical design envelope and would result in unnecessary weight.

From the foregoing, it can be seen that there has been brought to the art a new and improved direct torque flow connection. While the invention has been described in connection with one or more embodiments, it should be understood that the invention is not limited to those embodiments. On the contrary, the invention covers all alternatives, modifications, and equivalents as may be included within the spirit and scope of the appended claims.

The invention claimed is:

1. A direct torque flow assembly comprising:
   an inner joint part comprising inner ball tracks, and a spline hole defining a spline length (LS) and adapted to engage a journal shaft of a drive unit;
   an outer joint part having outer ball tracks and directly connected to a shaft;
   a cage between the inner joint part and outer joint part; and
   a plurality of balls (N) held by said cage and engaging pairs of the inner and outer ball tracks, said balls defining a joint pitch circle diameter (PCD), wherein $2.5 \leq (PCD/LS) \leq 3.2$ is satisfied, wherein said inner joint part, said outer joint part, and said cage and said plurality of balls form one of a threaded fastener constant velocity universal joint wherein the inner joint has a threaded portion, a collet spring constant velocity universal joint, or a clip constant velocity universal joint.

2. A direct torque flow assembly according to claim 1 wherein each of said balls has a diameter (d), wherein all units are in millimeters and $1 \leq ((PDC/2)*d^2*N))/(1000*LS) \leq 8$ is satisfied.

3. A direct torque flow assembly according to claim 2 wherein said shaft has a diameter (TD), and $0.5 \leq (TD/LS) \leq 2.0$ is satisfied.

4. A direct torque flow assembly according to claim 3 wherein said inner ball tracks define an inner race width (WIR) and $0.3 \leq (WIR/LS) \leq 1.0$ is satisfied.

5. A direct torque flow assembly according to claim 2 wherein said inner ball tracks define an inner race width (WIR) and $0.3 \leq (WIR/LS) \leq 1.0$ is satisfied.

6. A direct torque flow assembly according to claim 1 wherein said shaft has a diameter (TD), and $0.5 \leq (TD/LS) \leq 2.0$ is satisfied.

7. A direct torque flow assembly according to claim 6 wherein said inner ball tracks define an inner race width (WIR) and $0.3 \leq (WIR/LS) \leq 1.0$ is satisfied.

8. A direct torque flow assembly according to claim 1 wherein said inner ball tracks define an inner race width (WIR) and $0.3 \leq (WIR/LS) \leq 1.0$ is satisfied.

9. A direct torque flow assembly comprising:
an inner joint part comprising inner ball tracks, and a spline hole defining a spline length (LS) and adapted to engage a journal shaft of a drive unit;
an outer joint part having outer ball tracks and directly connected to a shaft; a cage between the inner joint part and outer joint part; and
a plurality of balls (N) each having a diameter (d), the balls held by said cage and engaging pairs of the inner and outer ball tracks, said balls defining a joint pitch circle diameter (PCD), wherein all units are in millimeters and $3 \leq ((PCD/2)*d^2*N))/(1000*LS) \leq 8$ is satisfied,
wherein said inner joint part, said outer joint part, and said cage and said plurality of balls form one of a threaded fastener constant velocity universal joint wherein the inner joint has a threaded portion, a collet spring constant velocity universal joint, or a clip constant velocity universal joint.

10. A direct torque flow assembly according to claim 9 wherein said shaft has a diameter (TD), and $0.5 \leq (TD/LS) \leq 2.0$ is satisfied.

11. A direct torque flow assembly according to claim 10 wherein said inner ball tracks define an inner race width (WIR) and $0.3 \leq (WIR/LS) \leq 1.0$ is satisfied.

12. A direct torque flow assembly according to claim 9 wherein said inner ball tracks define an inner race width (WIR), and $0.3 \leq (WIR/LS) \leq 1.0$ is satisfied.

13. A direct torque flow assembly comprising:
an inner joint part comprising inner ball tracks, and a spline hole defining a spline length (LS) and adapted to engage a journal shaft of a drive unit;
an outer joint part having outer ball tracks and directly connected to a shaft having a diameter (TD);
a cage between the inner joint part and outer joint part; and
a plurality of balls held by said cage and engaging pairs of the inner and outer ball tracks, wherein $1.5 \leq (TD/LS) \leq 2.0$ is satisfied,
wherein said inner joint part, said outer joint part, and said cage and said plurality of balls form one of a threaded fastener constant velocity universal joint wherein the inner joint has a threaded portion, a collet spring constant velocity universal joint, or a clip constant velocity universal joint.

14. A direct torque flow assembly according to claim 13 wherein said inner ball tracks define an inner race width (WIR) and $0.3 \leq (WIR/LS) \leq 1.0$ is satisfied.

* * * * *